May 27, 1924.

J. E. CAPS

WATER SOFTENING APPARATUS

Original Filed June 26, 1916  3 Sheets-Sheet 2

1,495,317

Witnesses:
W. P. Kilroy
Harry H. L. White

Inventor:
John E. Caps
By Rudolph ... Atty.

May 27, 1924.

J. E. CAPS 1,495,317

WATER SOFTENING APPARATUS

Original Filed June 26, 1916   3 Sheets-Sheet 3

Witnesses:
W. F. Kilroy
Harry R. White

Inventor:
John E. Caps
By Rudolph _____ Atty.

Patented May 27, 1924.

1,495,317

UNITED STATES PATENT OFFICE.

JOHN E. CAPS, OF WILMETTE, ILLINOIS.

REISSUED

WATER-SOFTENING APPARATUS.

Application filed June 26, 1916, Serial No. 105,980. Renewed March 4, 1922. Serial No. 541,407.

*To all whom it may concern:*

Be it known that I, JOHN E. CAPS, a citizen of the United States, residing at Wilmette, in the county of Cook and State of Illinois, have invented certain new and useful Improvements in Water-Softening Apparatus; and I do hereby declare the following to be a full, clear, and exact description of the invention, such as will enable others skilled in the art to which it appertains to make and use the same.

This invention has for its object to provide an automatic water-softening apparatus in which there is employed as a softening agent, a mineral substance such as glauconite, or other quick regenerating base exchange silicates, which effects a change of bases with hard water filtered therethrough, and which is adapted to be regenerated periodically to remove the deposits of lime and magnesia from the surfaces of the mineral grains to condition said mineral for further activity in softening water.

The particular object of the present invention is to provide an apparatus of the character defined, in which the water-softening mineral is automatically regenerated and washed at intervals alternating with intervals of the filtration therethrough of water to be softened.

A further particular object of the invention is to provide an apparatus of the character defined in which the volume of water to be softened is accurately measured so as not to exceed the capacity of the softening mineral to efficiently perform its function between the intervals of regeneration thereof.

A further object of the invention is to provide an apparatus which will deliver a definite quantity of regenerating fluid to the exhausted water-softening mineral and afterward will deliver a definite quantity of wash water to relieve the water-softening mineral of such regenerating fluid so that it will again be ready for softening water.

A further particular object of the invention is to provide an automatic apparatus of the character defined which will supply soft water continuously.

Other objects of the invention will appear from the following specification.

The invention consists in the features of construction and combinations of parts hereinafter fully described and claimed.

In the accompanying drawings illustrating the invention:

Figure —1— is a view in elevation partly in section of a water-softening apparatus constructed in accordance with my invention.

Figure —2— is a fragmentary detail view in elevation showing a part of the valve-actuating mechanism.

Figure —3— is an end elevation looking toward the right-hand end of Figure —2—.

Figures —4— and —5— are fragmentary detail sections showing three-way valves employed and illustrating the different positions of said valves to control the flow of liquids through the apparatus.

Figures —6— and —7— are detail vertical sections showing the containers for regenerating solution and water for rinsing the water-softening agent and the mechanism for controlling the flow from the same.

Figure —8— is a detail view in elevation showing the mechanism for actuating the valve controlling the flow from one of the containers shown in Figures —6— and —7—.

Figures —9— and —10— are detail sections on the lines 9—9 and 10—10 respectively, of Figure —8—.

Figure 1:
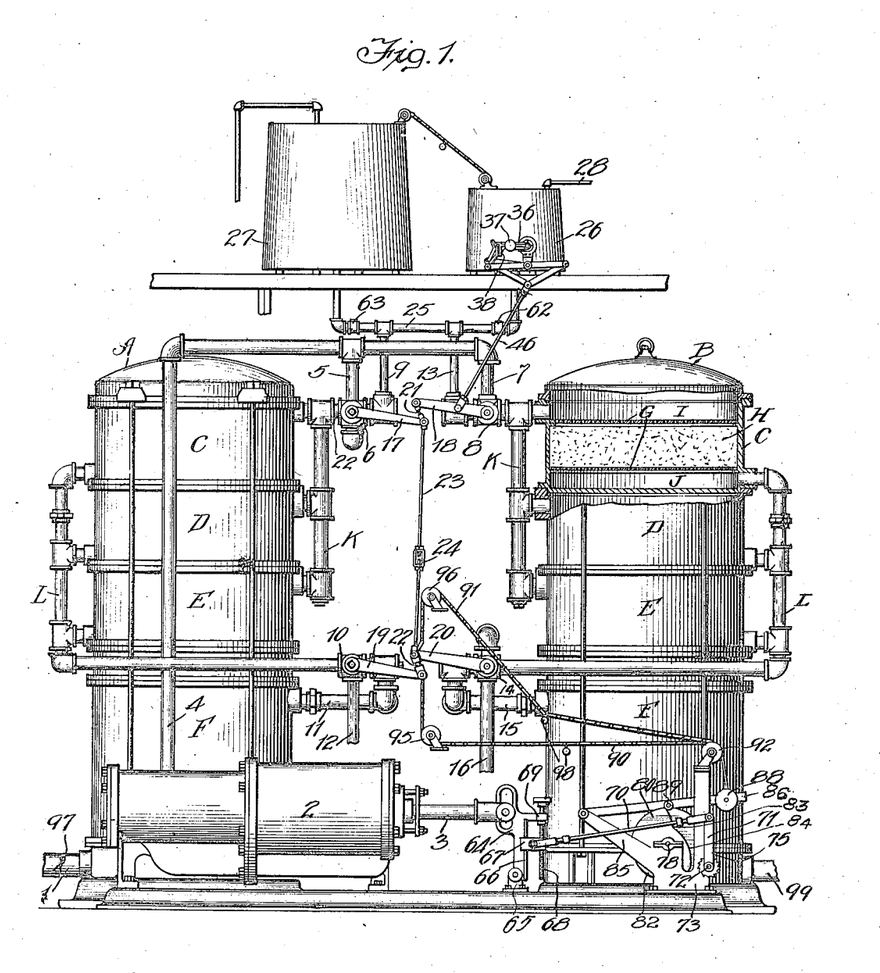

The apparatus comprises two containers A and B, respectively, for masses of the water-softening mineral. Each of said containers is divided into a plurality of compartments C, D, E and F disposed at different elevations. The compartments C, D and E are each adapted to receive a pair of foraminous plates G between which the masses or beds H of mineral are received, there being free spaces I and J in each compartment above and below the said plates G. Each of the spaces I is connected with a water supply pipe K and each of the spaces J is connected with a discharge pipe L leading into the chamber F constituting an ordinary filter chamber in which the soft water is merely freed of solids.

The water to be softened enters the water-meter 2 through a pipe 1, said water being under pressure and actuating the meter 2 which is very similar in construction to a direct acting steam engine. The meter 2 may also be a steam or mechanically actuated pump of which the pipe 1 is the suction or inlet-pipe and the pipe 4 is the discharge, the pump-cylinder constituting the water-measuring device or meter. The water or other actuating means causes a reciprocation of the piston rod 3, the latter making one stroke for each specific volume of water passing through the meter, or the like, hereinafter termed "meter." The water as it leaves the meter 2 enters the pipe 4 which has a branch 5 connecting with a valve-housing 6 and another branch 7 connecting with a valve-housing 8. Each of said housings is equipped with a three-way valve and is adapted to connect the branch 5 with the pipe K and also to shut off communication between said branch 5 and pipe K and establish communication between the latter and a pipe 9. The water admitted to the pipe K passes into the several chambers C, D and E of the container A and thence through the pipe L to a valve-housing 10 also equipped with a three-way valve adapted to establish communication between the pipe L and a pipe 11 leading to the filter chamber F, or to a pipe 12 leading to the sewer. The branch 7 of the pipe 4 is adapted similarly to communicate with the pipe K of the container B by the valve in the housing 8, the latter being adapted also to cut off such communication and establish the same between said pipe K and the pipe 13. The water admitted to the pipe K of the container B passes through the several chambers C, D and E thereof, and into the pipe L, and thence to the valve housing 14 which is similar to the valve housing 10 and is equipped with a valve adapted to connect the pipe L with the pipe 15 leading to the filter chamber F, or with the pipe 16 leading to the sewer.

Each of the three-way valves in the housings 6, 8, 10 and 14 is equipped with a valve lever 17, 18, 19 and 20 respectively, and in the following pages I will refer to the valves and levers by the last-named reference characters for purposes of convenience.

The valve levers 17 and 18 extend toward each other and are coupled at their free ends by means of a link 21, the valve levers 19 and 20 being similarly coupled by means of a link 22 and the valve levers being all connected to be turned in unison by means of a connecting rod 23 equipped with the turn-buckle 24 for purposes of adjustment in a well-known manner.

The arrangement of the three-way valves is such that when the pipe K of the chamber A is connected with the branch 5 of the pipe 4, the branch 7 of the latter will be cut off from communication with the pipe K of the container B, but the latter will at that time be placed in communication with the pipe 13, which constitutes a branch of the pipe 25 connected with the two tanks 26 and 27 respectively. The tank 26 is adapted to contain a regenerating solution for the water-softening mineral beds H, and the other of said tanks is adapted to contain flushing or rinsing water for rinsing or clearing the filter beds of the regenerating solution after the latter has been passed through the same. While the pipe K of the container B communicates with the said pipe 13, the pipe L of said container communicates with the pipe 16 leading to the sewer so that the regenerating solution after passing through the filter beds is drained off and is followed by the flush-water from the tank 27, which is also drained off, whereafter the container B is again ready for the passage therethrough of water to be softened.

Figures 3, 4, 5:
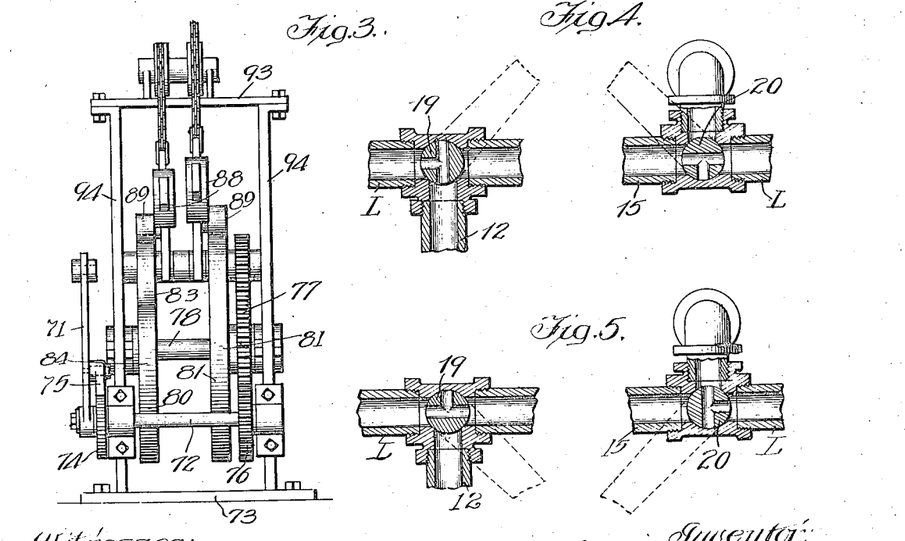

In order to more fully illustrate the operation of the valves I have shown in Figures —4— and —5— the valves 19 and 20 in their several respective positions, said Figures being equally illustrative of the valves 17 and 18 with obvious changes in position of ducts. Thus in Figure —4— said valves are positioned so that the pipe L of the container A communicates with the pipe 12 leading to the sewer; whereas the pipe L of the container B communicates with the pipe 15 leading to the filter chamber F. In Figure —5— the position of the valves 19 and 20 is respectively reversed.

Figure 6:
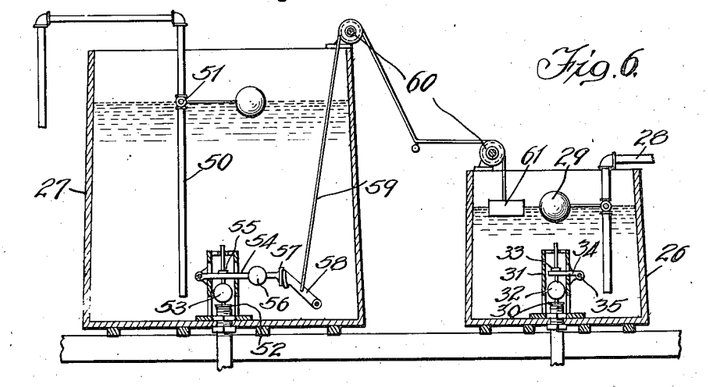
Figure 8:
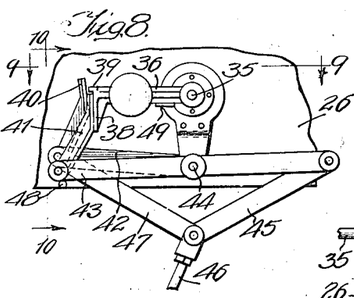

The valve-lever 18 is connected with valve mechanism controlling the discharge of liquid from the tank 26, so that when communication is established between either of the pipes 13 and 9 and the pipes K of the respective containers A and B, the contents of the tank 26 will pass through one of said pipes and the filter beds. The tank 26 is adapted to contain, for example, common salt brine which is fed into the same through a pipe 28 from a suitable source of supply, the outlet end of said pipe being controlled by an ordinary float valve in the usual manner to maintain a given level of brine therein. The outlet from said tank 26 is controlled by a flat disc-valve 30, the stem of which is suitably guided in a housing 31 and carries a float 32, said valve being normally held on its seat against the action of the float 32 by the hydrostatic pressure upon the upper face of the valve 30. Upon raising the valve, however, the pressure on opposite faces thereof becomes substantially equalized and thereupon the float 32 will support said valve in its raised position, but will cause it to again close as the water-level in the tank 26 lowers by virtue of the discharge of its contents, and when closed said valve will be again held on its seat by the hydrostatic pressure in a well-known manner. Between the ends of the valve-stem of said valve 30 is a collar 33 which is disposed in the path of a pivoted arm 34 mounted on a shaft 35 which extends through the wall of the tank 26 and carries an arm 36 equipped with a The apparatus as shown and described attains the several objects of the invention hereinbefore set forth. The apparatus is obviously capable of considerable variation and modification, as mechanical skill may dictate, but all such variations and modifications are included in the invention as defined in the appended claims. While the drawings show two tanks or containers, or to be more exact two stacks of sections or cells (as they are generally called in the trade); it is obvious that other numbers of stacks of such sections or cells could be used and these stacks so connected as to operate in groups.

While in its preferred embodiment, the regeneration and washing of the water-softening mineral beds is automatically accomplished, it will be obvious that the means for automatically performing these functions may be omitted without departing from the invention as defined in the appended claims.

I claim as my invention:

1. Water-softening apparatus comprising two containers for water-softening mineral, a source of supply of water to be softened connected with both said receptacles, connection between the latter and service pipes and with a drain, connection between said receptacles and sources of supply of a regenerating liquid for the water-softening mineral and wash-water for the same respectively, valves controlling all of said connections, and valve-actuating means adapted to actuate said valves for connecting one of said containers with the water supply and service pipes and the other thereof with said source of supply of regenerating liquid and subsequently with the source of supply of wash water and the said drain.

2. Water-softening apparatus including containers for water-softening mineral, a source of supply of a regenerating solution for the same, means for letting in a supply of water to be softened, and discharge connections to sewer and service pipes respectively, valves controlling the said several connections for connecting said containers with said water-supply and service pipes and with said source of supply of regenerating solution and the sewer, means for measuring the volume of water supplied, mechanism associated with and actuated by said means, and connection between said mechanism and said valves for automatically actuating the same at intervals to effect flow of water to be softened to said containers alternately.

3. Water-softening apparatus comprising two containers for water-softening mineral, a single source of supply of water to be softened common to both thereof, valves controlling the connection of both containers with said source of supply, a water-meter through which water fed to said containers must pass, and mechanism operatively connected with and adapted to be actuated by said water-meter and operatively connected with said valves for actuating the latter to close one thereof, and open the other, whereby to alternately connect said containers with said source of supply at intervals determined by the volume of water passing through said meter.

4. Water-softening apparatus comprising two containers for water-softening mineral, a single source of supply of water to be softened common to both thereof, valves controlling the connection of both containers with said source of supply, mechanism interposed in the connection of said source of supply with said containers for measuring the water supplied thereto, mechanism for actuating said valves for shutting off the water-supply to one of said containers as the other is connected therewith, said last-named mechanism actuated by said water-measuring mechanism.

5. Water-softening apparatus comprising two containers for water-softening mineral, a single source of supply of water to be softened common to both thereof, valves controlling the connection of both containers with said source of supply, a water-meter interposed in the connection of said containers with said source of supply and including a reciprocable element, and mechanism adapted to be actuated by said reciprocable element and operatively connected with said valves for simultaneously actuating the same to close one thereof and open the other.

6. Water-softening apparatus including a container for a mass of water-softening mineral adapted to be interposed in the water supply system of a building or the like, for supplying soft water at all points of discharge in said system, a source of supply of a regenerating solution for said mineral mass connected with said container, a drain connected therewith, and valves controlling all of said connections and connected together to be actuated in unison to shut off the water supply through said container and at the same time connect said source of regenerating solution and said drain with said container and vice versa, a water-meter interposed in the water supply system, and mechanism adapted to be actuated thereby and operatively connected with said valves for automatically actuating the latter at intervals determined by the volume of water passing through said system.

7. Water-softening apparatus including a container for a mass of water-softening mineral adapted to be interposed in the water-supply system of a building or the like to supply soft water at every outlet, a water-meter interposed in said system, a second source of supply of water to said container, a source of supply of a regenerating solution connected with said container, a drain connected with the latter, valves controlling all of said connections and connected together to be simultaneously actuated to shut off said container from the water supply system of the building and at the same time to connect the same with said source of regenerating solution, said second water supply and said drain, and operative connection between said valves and said water-meter to be actuated by the latter at intervals determined by the volume of water passing therethrough.

8. Water-softening apparatus including a container for a mass of water-softening mineral adapted to be interposed in the water-supply system of a building or the like to supply soft water at every outlet, a water-meter interposed in said system, a second source of supply of water to said container, a source of supply of a regenerating solution connected with said container, a drain connected with the latter, valves controlling all of said connections and connected together to be simultaneously actuated to shut off said container from the water supply system of the building and at the same time to connect the same with said source of regenerating solution, said second water supply and said drain, and operative connection between said valves and said water-meter to be actuated by the latter at intervals determined by the volume of water passing therethrough, and mechanism associated with said second water supply and said source of regenerating solution for automatically effecting flow of water from said second supply following the flow of a predetermined volume of said regenerating solution into said container.

9. Water-softening apparatus including a container for a mass of water-softening mineral adapted to be interposed in the water-supply system of a building or the like to supply soft water at every outlet, a water-meter interposed in said system, two liquid-containing tanks connected with said container, a drain connected with the latter, valves controlling all of said connections and connected together to be simultaneously actuated to shut off said container from the water supply system of the building and at the same time to connect the same with said tanks and said drain, means controlled by the water level in one of the latter for causing said tanks to empty successively, and operative connection between said valves and said water-meter to be actuated by the latter at intervals determined by the volume of water passing therethrough.

10. Water-softening apparatus including a container for a mass of water-softening mineral adapted to be interposed in the water-supply system of a building or the like to supply soft water at every outlet, two liquid-containing tanks connected with said container, a drain connected with the latter, valves controlling all of said connections and connected together to be simultaneously actuated to shut off said container from the water supply system of the building and at the same time to connect the same with said tanks and said drain, means controlled by the water level in one of the latter for causing said tanks to empty successively.

11. Water-softening apparatus including two containers for masses of water-softening mineral adapted to be interposed in the water-supply system of a building or the like to supply soft water at all service outlets, a tank for regenerating liquid connected with said containers, a drain connected therewith, valves controlling all of said connections connected together to be actuated in unison for throwing one of said containers out of the water supply system and the other into the same and simultaneously therewith connecting the first-named container with said tank and said drain, and vice versa.

12. Water-softening apparatus including two containers for masses of water-softening mineral adapted to be interposed in the water-supply system of a building or the like to supply soft water at all service outlets, two tanks for liquids connected with said containers, a drain connected therewith, valves controlling all of said connections connected together to be actuated in unison for throwing one of said containers out of the water supply system and the other into the same and simultaneously therewith connecting the first-named container with said tanks and said drain, and vice versa, means controlled by the water level in one of the latter for causing said tanks to empty successively.

Figure 9:
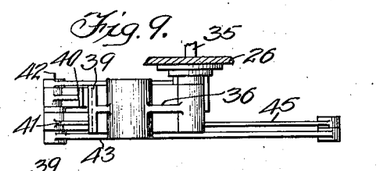
Figure 10:
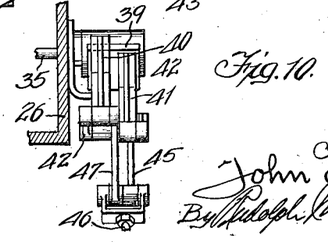

13. Water-softening apparatus including two containers for masses of water-softening mineral adapted to be interposed in the water-supply system of a building or the like to supply soft water at all service outlets, a tank for regenerating liquid connected with said containers, a drain connected therewith, valves controlling all of said connections connected together to be actuated in unison for throwing one of said containers out of the water supply system and the other into the same and simultaneously therewith connecting the first-named container with said tank and said drain, and vice versa, a water-meter interposed in said water supply system, and mechanism associated with the same and said valves and adapted to be actuated by said meter for auweight 37 and with a shoe 38, the latter being equipped with a projection 39 adapted to be engaged by the ends of two trip-levers 40 and 41 respectively. The said trip lever 40 is pivotally mounted upon the end of an arm 42 and the lever 41, similarly mounted at one end of a lever 43. The latter is pivotally mounted between its ends on a stud 44 while the arm 42 is pivotally mounted at its other end on said stud. The other end of the lever 43 is pivotally connected by means of a link 45 with the connecting rod 46 connecting the same with the valve lever 18, and the lever 42 is similarly connected with said connecting rod 46 by means of a link 47. A stop 48 is provided for limiting the pivotal movement of both the levers 42 and 43 in one direction, and a stop 49 limits the downward movement of the lever or arm 36.

Referring now to Figure —1—, it will be observed that as the valve-lever 18 becomes positioned similarly to the lever of the valve lever 20, shown in said figure (which would be coincidental therewith) the connecting rod 46 will be raised to the upper limit of its movement, and will tend to raise both the links 45 and 47. This would have no influence to turn the lever 43 because of the engagement of the latter with the stop 48 at the end opposite to that connected with the rod 46 and would, therefore, result in a pivotal movement of the link 45 relative to the lever 43, but at the same time the upward movement of the connecting rod 46 would be transmitted to the lever 42 which would result in raising the trip lever 40. The engagement of the latter with the projection 39 would cause the arm 36 to be raised thereby turning the shaft 35 and arm 34, thus raising the valve 30 off its seat, and causing the contents of the tank 26 to be drained off, as said valve would be maintained in its raised position by the float 32.

As the valve lever 18 is turned to the position indicated in Figure —5—, the connecting rod 46 will pull downwardly on both links 45 and 47, but obviously the lever 42 would not respond to movement in this direction because of the stop 48 so that the motion would be transmitted only to the lever 43 with the result that the trip lever 41 thereof would effect the raising of the arm 36, thereby again opening the valve 30. As either of the trip levers move upwardly it will be obvious that they will pass out of engaging relation to the projection 39 so that the arm 36 will then drop back to its normal position before the trip lever has entirely completed its upward movement. This construction and operation is well-known, particularly in the art of closet-flushing and will be readily understood.

Figure 7:
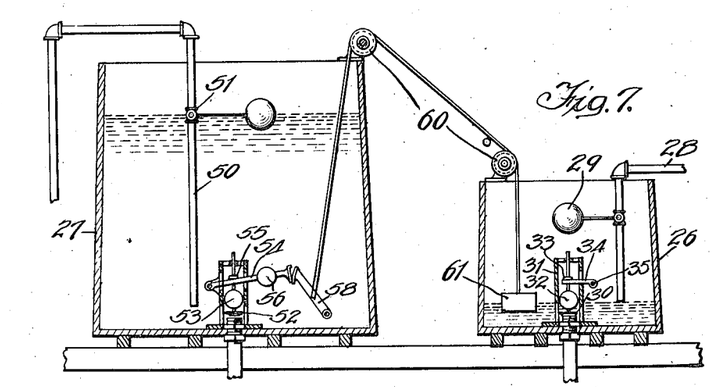

Thus upon each change is position of the several three-way valves the contents of the tank 26 would be drained off to pass through the beds of water-softening mineral contained in that one of the containers A and B which is thrown out of communication with the pipe 4. After the tank 26 has been so drained and after each draining thereof it should be followed by the draining of the tank 27. The latter is fed from a suitable source of supply by means of the pipe 50 equipped with a float valve 51. The outlet from said tank 27 is similarly controlled by a flat disc-valve 52 adapted to be supported by a float 53, and adapted to be opened by the lever 54 engaging the collar 55 on the stem of said valve; the said lever 54 being pivotally connected with the valve-housing and carrying the weight 56 and a shoe 57. The latter is adapted to be actuated by the trip-lever 58 which is connected by means of a cable or chain 59 trained over pulleys 60, with a float 61 in the tank 26. The said float 61 will drop with the liquid level in the tank 26, and, as the latter approaches its lowest point, the chain or cable 59, which contains sufficient slack to enable the float 61 to move downwardly a considerable distance without exerting any strain on the trip lever 58, will have taken up such slack and will thereupon turn said lever 58, thereby raising the lever 54 and thus lifting the valve 52 from its seat. This will cause the water contained in the tank 27 to drain off and follow the contents of the tank 26 through the container A or B at that time connected with the pipe 25. In order to prevent the water from the tank 27 entering the tank 26 the pipe 25 is equipped with a check-valve 62 and also with a check-valve 63 which prevents flow from the tank 26 into the tank 27. From the foregoing description it will be seen that all of the three-way valves will be simultaneously operated, and by the connection between the latter and the valve mechanism of the tank 26, each movement of the three-way valve for stopping the flow of water to be softened through one of the containers A or B and causing it to flow through the other thereof, will be followed by the passage through the then inactive container, of the regenerating liquid from the tank 26 followed by the washing or rinsing water from the tank 27.

I will now described more particularly the mechanism whereby the flow through the tanks A and B is automatically alternated, at regular intervals controlled and determined by the volume of water passing through the meter 2.

Figure 2:
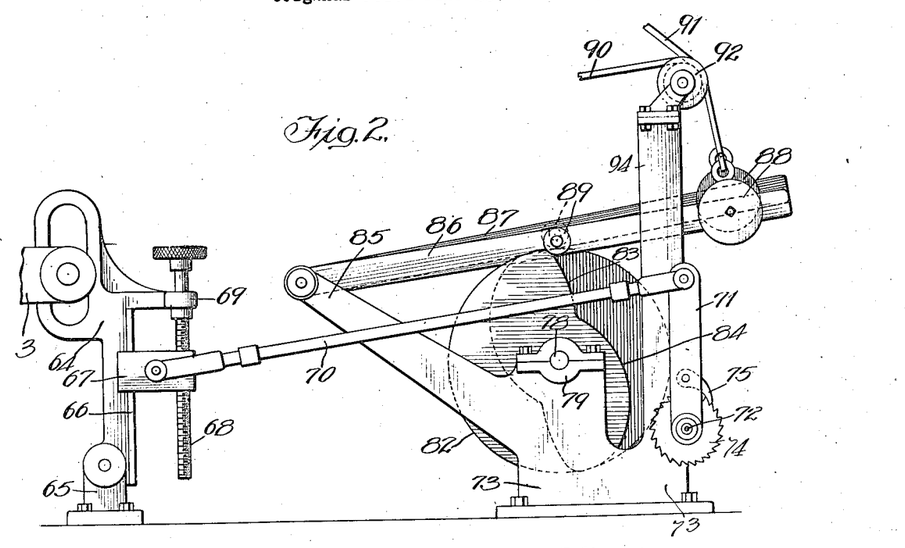

The piston rod 3 is connected with a rocking lever 64 pivotally mounted on a standard 65. The said lever 64 is equipped with a guide-flange 66 engaging a shoe 67 which is also engaged by the screw-shaft 68 rotatably mounted in a projection 69 of said lever 64 and which is axially parallel with the guide flange 66. The said screw-shaft is held against longitudinal movement relatively to the projection 69, and may be turned to raise and lower the shoe 67 for the purpose of varying the stroke of the connecting rod 70 which connects the shoe 67 with a rocking lever 71 pivotally mounted on a shaft 72 journalled in a standard or frame 73. The last-named construction is more fully illustrated in Figures —2— and —3—, reference to which will now be had.

The shaft 72 carries a ratchet wheel 74 which is engaged and rotated by means of a dog or pawl 75 pivotally mounted on the lever 71. Said shaft also carries a spur-pinion 76 which meshes with a spur gear 77 on a shaft 78 journalled in bearings 79. Said shaft 78 carries two cams 80 and 81 respectively. Each of the latter has a surface 82 concentric with its axis of rotation extending through an arc of about, or slightly in excess of, one hundred eighty degrees, and a cam surface 83 which extends almost radially of the axis of rotation and a cam surface 84 describing, substantially, a short spiral connecting the inner end of the surface 83 tangentially with the surface 82. The cams are so disposed that their surfaces 83 are diametrically opposed. The frame or standard 73 is equipped with an arm 85 in the outer end of which two levers 86 and 87 are pivotally mounted. Each of said levers is equipped at its free end with a weight 88, and between its ends with an anti-friction roller 89, one of said rollers resting upon the surface of the cam 80, and the other thereof on the surface of the cam 81. Connected with the weights 88 are two cables 90 and 91 respectively, which are trained over idlers 92 supported on the cross-head 93 of standards 94 of the frame 73. The cable 90 is further trained over an idler pulley 95, suitably supported at a point between the containers A and B, and connects at its other end with the link 22 of one of the valve-levers 19 or 20. The cable 91 is similarly trained over an idler 96 suitably supported between the containers A and B above the valve-levers 19 and 20, and is connected with the latter; the idler 95 being disposed below said valve levers.

As shown in Figure —2—, the anti-friction roller 89 of the lever 86 is disposed practically at the outer end of the cam surface 83, and when disposed in this position said lever 86 will drop rather suddenly, thereby pulling the several valve-levers of the several three-way valves down to the position shown in Figure —5—. During this downward movement of the lever 86 the roller 89 thereof will effect the forced revolution through a short arc of the cam 80; there being obviously relatively little resistance to such rotation and the latter serving to slightly cushion or retard the dropping of said lever.

As previously described, when the lever 86 has dropped as aforesaid and turned the valves to the position shown in Figure —5—, the water from pipe 4 will pass through the container A and filter F to the service pipe 97 and at this time the contents of the tanks 26 and 27 will successively flow through the container B and thence through pipe 16 to the sewer. The dropping of the lever 86 would, of course, effect a raising of the lever 87, but to prevent this the cable 91 will have a sufficient amount of slack therein which will be taken up during the dropping of the lever 86 without affecting the position of said lever 87. During the further rotation of the cams the lever 86 will be gradually restored to the upper limit of its movement, and during this period slack will be provided in the cable 90 which will be taken up by the dropping of the lever 87 when the surface 83 of its cam becomes positioned as the surface 83 of the cam controlling the lever 86 is shown to be positioned in full lines in Figure —2—. For the purpose of maintaining the cables 90 and 91 in the grooves of their several idler pulleys during this building up of slack therein, each of said cables is equipped with a weight 98.

As the lever 87 drops in the manner of the lever 86 and at the proper interval, water from the pipe 4 will pass through the container B, and at this time the contents of the tanks 26 and 27 will pass through the container A and thence through pipe 12 to sewer; whereas the softened water after being filtered through the filter chamber F of container B will pass to the service pipe 99 which, as well as the pipe 97, connects with the service pipe of the building or plant, such as a laundry, in which the apparatus is installed.

It will be obvious, of course, that the shoe 67 may be adjusted to a very considerable degree to greatly vary the volume of water passing through either of the containers A or B before being deflected to pass through the other of said containers, thus enabling the same apparatus to be used for softening water of different degrees of hardness, and also varying the duration of the intervals of regeneration and washing of the water-softening mineral beds employed.

It will be further noted that the containers A and B are built up in sections and may be readily taken apart for purposes of repair and renewal of the beds of water-softening mineral and filter beds thereof, and that such containers may be built up to any desired height to provide a greater or less number of beds of water-softening mineral according as the circumstances may require.

tomatically actuating said valves at intervals determined by the volume of water passing through said meter.

14. Water-softening apparatus including two containers for masses of water-softening mineral adapted to be interposed in the water-supply system of a building or the like to supply soft water at all service outlets, two tanks for liquids connected with said containers, a drain connected therewith, valves controlling all of said connections connected together to be actuated in unison for throwing one of said containers out of the water supply system and the other into the same and simultaneously therewith connecting the first-named container with said tanks and said drain, and vice versa, means controlled by the water level in one of the latter for causing said tanks to empty successively, a water-meter interposed in said water supply system, and mechanism associated with the same and said valves and adapted to be actuated by said meter for automatically actuating said valves at intervals determined by the volume of water passing through said meter.

15. Water-softening apparatus including two containers for masses of water-softening mineral adapted to be interposed in the water-supply system of a building or the like to supply soft water at all service outlets, valves controlling the connection of each of said containers with the said water supply system, coupling for said valves for simultaneously actuating the same to cause the water to be shut off from one of said containers and pass through the other thereof, and mechanism controlled by the volume of water passing through said supply system operatively connected with and adapted to actuate said valves at intervals.

16. A water-softening apparatus including two containers for predetermined quantities of water to be softened, a filter bed containing zeolite associated with each container, valve-controlled connection between said containers and service piping, mechanism controlled by the water levels in said containers for alternately connecting the same with said service piping, a source of supply of regenerating fluid for regenerating the zeolite for each bed after each draining of the tank with which the same is associated, a water supply for each container, and mechanism associated with the aforesaid mechanism for successively introducing brine and fresh water into each container, including means for draining off such brine and a flushing charge of fresh water to eliminate the brine preparatory to refilling the container.

17. Water-softening apparatus including a zeolite filter-bed, means for passing a predetermined volume of water to be softened therethrough and automatically shutting off the supply thereof, means for automatically passing a predetermined volume of regenerating liquid therethrough following the shutting off of the water supply, means for automatically passing a predetermined volume of flush water therethrough following the flow of regenerating liquid, and means for automatically reopening the water supply to the filter-bed following the flushing thereof.

18. Water-softening apparatus including a zeolite filter-bed interposed between a source of supply of water to be softened and service piping, a source of supply of regenerating liquid, and a source of supply of flushing water and a drain all communicating with said filter-bed, valves controlling all of said communications, and means controlled by the flow of a predetermined volume of water to be softened through said filter-bed for effecting closure of the water supply and service valves and effecting connection with said drain and said sources of regenerating liquid and flush water for preparing said filter-bed for the passage therethrough of another predetermined volume of water to be softened.

19. Water-softening apparatus including a water supply, service piping, a zeolite filter-bed interposed between said parts, valves controlling the connection of the filter-bed with both, a source of zeolite regenerating liquid, a drain, valves controlling the connection of both with said filter, and mechanism controlled by the water volume passed through the filter-bed for actuating said valves to shut off the water supply and service pipe from communication with the filter-bed and cause regenerating liquid to pass through and drain from said filter bed, said valves and mechanism including means for causing a charge of flushing water from said water supply to pass through the filter-bed following the passage of regenerating liquid therethrough.

20. Water-softening apparatus including a zeolite filter, a source of supply of water having valve-controlled connection therewith, a source of supply of zeolite regenerating liquid connected therewith, mechanism controlled by the volume of water passing through the filter for automatically shutting off the water supply from the same at predetermined intervals and simultaneously therewith opening communication between the same and said source of regenerating liquid, means controlled by the volume of regenerating liquid passing into the filter for interrupting the communication of the source thereof with the latter and effecting temporary connection with the water supply to flush the filter, a drain for the latter, and means included in said mechanism for maintaining said drain open during the period of regeneration and flushing of said filter.

21. In a water-softening apparatus, a reagent drum, means for passing water to be softened through the reagent in said drum, a water meter for measuring the water flowing through said drum, a valve for shutting off the flow of water through the drum, and means operable by said meter for actuating the said valve.

22. A water softening apparatus comprising two containers having a filter bed of base exchange silicates in each, a regenerating solution container, means for supplying hard water to the filter bed containers alternately, means for withdrawing soft water from the filter bed containers alternately, means for supplying regenerating solution from the regenerating solution container to the filter bed containers and for washing out the excess regenerating solution from the filter bed containers alternately, means for metering the water treated, interconnected valve means actuated by said metering means to alternately change the filter bed containers from the softening phase to the reconditioning phase, the reconditioning phase including both treating with regenerating solution and washing out the excess regenerating solution.

23. A softening apparatus comprising two or a number of containers constituting two groups having a filter bed of base exchange silicates in each container, a regenerating solution container, means for supplying hard water to the groups of filter bed containers alternately, means for withdrawing soft water from the groups of filter bed containers alternately, means for supplying regenerating solution from the regenerating solution container to the filter bed groups of containers and for washing out the excess regenerating solution from the groups of filter bed containers alternately, means for metering the water treated, interconnected valve means actuated by said metering means to alternately change the group of filter bed containers from the softening phase to the reconditioning phase, the reconditioning phase including both treating with regenerating solution and washing out the excess regenerating solution.

24. In a water-softening apparatus the combination of a plurality of tanks containing water softening material, means for supplying the water to be softened to said tanks to cause it to pass through said material, a common container for the revivifying agent, means for supplying said agent to each of said tanks to cause it to pass through said water softening material and means for so controlling the flow of the revivifying agent that it will pass to one or a group of said tanks and not to another one or group of tanks.

25. In a water-softening apparatus the combination of two tanks containing a base exchange silicate, means for supplying the water to be softened to said tanks to cause it to pass through said base exchange silicate, a common container for a revivifying agent, a fluid connection from said container to each of said tanks to cause said agent to pass through said base exchange silicate and means for alternately cutting off the supply of said agent to said tanks so that the process of water softening may be going on in one tank while the process of revivifying the base exchange silicate is going on in the other, and that these processes may alternate so as to constitute a continuous water softening apparatus.

In testimony whereof I have signed my name in presence of two subscribing witnesses.

JOHN E. CAPS.

Witnesses:
R. W. LOTZ,
M. M. BOYLE.